United States Patent [19]

Engle et al.

[11] 3,944,286
[45] Mar. 16, 1976

[54] BRAKE SYSTEM INCLUDING MEANS FOR ENSURING PARKING BRAKE RELEASE

[75] Inventors: Thomas H. Engle, Cape Vincent; Thomas M. Bogenschutz, Clayton, both of N.Y.

[73] Assignee: General Signal Corporation, Rochester, N.Y.

[22] Filed: Sept. 19, 1974

[21] Appl. No.: 507,516

[52] U.S. Cl. .................... 303/13; 188/265; 303/89
[51] Int. Cl.² ........................................ B60T 17/16
[58] Field of Search ............... 303/13, 89, 9, 71; 188/265, 353, 67, 170; 91/44; 92/24, 27, 28, 26; 60/547

[56] References Cited
UNITED STATES PATENTS

| 3,037,819 | 6/1962 | Sukala ........................ 303/89 |
|---|---|---|
| 3,095,067 | 6/1963 | Murty et al. .................... 188/170 |
| 3,228,730 | 1/1966 | Schubert ........................ 303/89 X |
| 3,294,455 | 12/1966 | Valentine ....................... 303/13 X |
| 3,508,794 | 4/1970 | Engle ........................... 303/89 X |
| 3,597,016 | 8/1971 | Gachot et al. ................... 303/13 X |
| 3,622,207 | 11/1971 | Engle ........................... 303/13 |
| 3,707,309 | 12/1972 | Engle ........................... 303/13 |
| 3,717,386 | 2/1973 | Edmansson et al. ............. 188/265 X |

*Primary Examiner*—Trygve M. Blix
*Assistant Examiner*—Douglas C. Butler
*Attorney, Agent, or Firm*—Pollock, Vande Sande & Priddy

[57] ABSTRACT

A brake system for a wheeled carrier having manually operable apparatus for actuating and locking parking brakes at the wheels, the system including automatically operable apparatus for ensuring release of the manually operable parking brakes when it is desired to move the vehicle.

7 Claims, 5 Drawing Figures

BRAKE SYSTEM INCLUDING MEANS FOR ENSURING PARKING BRAKE RELEASE

CROSS REFERENCE TO RELATED APPLICATIONS

This application is related to the systems shown in copending U.S. applications Ser. Nos. 302,415 filed October 31, 1972 by Thomas H. Engle; 393,529 filed Aug. 21, 1973 by Thomas H. Engle now U.S. Pat. No. 3,845,991; 414,461 filed Nov. 10, 1973 by Thomas H. Engle, Glen L. Bohusch and Thomas M. Bogenschutz now U.S. Pat. No. 3,895,850; and 484,187 filed June 28, 1974 by Thomas H. Engle. The disclosures of these applications are hereby incorporated by reference.

BACKGROUND OF THE INVENTION

Pnuematic-to-hydraulic brake systems have come into extensive use in railcar and other types of braking systems in recent years. In many instances, it has been found desirable to provide an independent means for applying and locking the brakes when the car is not connected to a source of pressurized air such as would conventionally be used to actuate the brakes. Such independent parking brake means permit each car to be slowed, stopped and restrained in a chosen location by a single crewman. Copending application Ser. No. 484,197 is an example of a recently developed system for articulated railcars incorporating a new type of parking brake actuator. As discussed in Ser. No. 484,197, parking brake systems may include means for applying, locking and unlocking the parking brakes which are actuated by a handwheel or similar device located conveniently on the car. U.S. Pat. No. 3,586,138 discloses a hydraulically operated brake locking mechanism suitable for use in these applications.

The prior art systems such as that of U.S. Pat. No. 3,586,138 for actuating and locking railcar parking brakes may create problems in use since it is frequently the case that the parking brake has not been fully unlocked and released by a crewman before an attempt is made to move the car. Obviously, this can cause numerous delays to locate the stuck brakes, undue brake wear if some movement does occur and similar deleterious effects.

An object of the invention is to provide a system for ensuring parking brake release which will positively unlock the parking brake locking mechanism to permit car movement yet will not interfere with subsequent operations of the parking brake system.

Another object of the invention is to provide a system for ensuring parking brake release which will permit parking brake application even when the release ensuring system is actuated.

Another object of the invention is to provide a brake release ensuring system which is automatic and operates from available sources of pressurized fluid such as the conventional brake pipe pressure system of prior art railcars.

One skilled in the art will realize that some or all of the above objects are realized by the invention disclosed herein and may recognize other objects of the invention not specifically set forth; however, the scope of the invention is to be limited only by the claims presented hereafter.

SUMMARY OF THE INVENTION

To overcome these and other deficiencies in prior art braking systems, the invention comprises a brake system for a wheeled vehicle of the type including independently operable parking brake means for actuating, locking and unlocking the vehicle brakes and fluid pressure operable service and emergency brake means for actuating said vehicle brakes in response to a reduction in fluid pressure, including novel means responsive to an increase in said fluid pressure for automatically unlocking said parking brake means.

DESCRIPTION OF THE PREFERRED EMBODIMENTS

Figure 1:
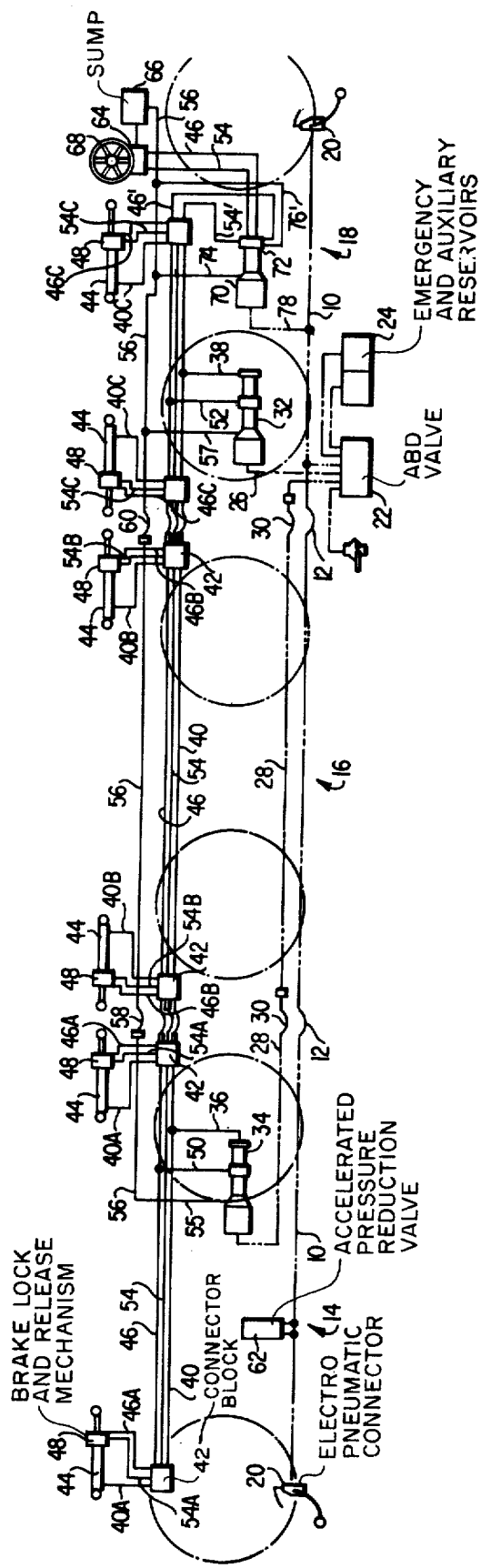
FIG. 1 shows a schematic diagram of the hydraulic and pneumatic lines and components of an articulated railcar embodying the invention.

FIG. 1 shows a schematic diagram of a brake system incorporating the brake release ensuring features of the invention. An air pressure line 10 runs throughout the length of an articulated car such as shown in Ser. No. 484,197 and includes flexible couplings 12 between car sections 14 and 16, and 16 and 18, as indicated. Of course, the invention may be used in conventional, non-articulated cars. Couplings 12 are so designed that should sections of the articulated car become separated during use, the coupling will break and permit pressure line 10 to depressurize on either side of the break. Air pressure line 10 may be connected to the corresponding pressure lines of an adjacent rail car of articulated or conventional design via electro-pneumatic connector 20, such as that disclosed in application Ser. No. 414,461. In the illustrated embodiment, a standard ABD valve assembly 22, including the conventional two compartment air reservoir 24 for service and emergency brake applications is attached to section 18 of the articulated car in fluid communication with air pressure line 10. Pneumatic lines 26 and 28 extend from ABD valve assembly 22 as indicated. Line 28 runs from section 18 back through sections 16 and 14 and is joined between sections 18 and 16, and 16 and 14 by conventional flexible couplings 30 which, when broken, reseal line 28 on either side of the break to prevent depressuriztion. Lines 26 and 28 are connected, respectively, to pneumatic-to-hydraulic boosters 32 and 34, located in sections 18 and 14. A booster assembly suitable for use in this invention is disclosed in application Ser. No. 302,415. Boosters 32 and 34 include hydraulic output lines 36 and 38 which are connected to service brake line 40, as indicated. Service brake line 40 runs throughout the length of sections 14, 16 and 18 and is flexibly connected between sections 14 and 16, and 16 and 18 via connector blocks 42 which incorporate flexible couplings identical in function to couplings 30. Connector blocks 42 provide hydraulic communication from brake lines 40 to brake actuators 44 via lines 40A, 40B and 40C.

A parking brake actuation line 46 runs along the length of sections 14, 16 and 18 and is flexibly joined between sections 14 and 16, and 16 and 18 by connector blocks 42. Parking brake actuation line 46 is connected via blocks 42 to the brake locking portion of brake locking and unlocking mechanism 48 via lines 46A, 46B and 46C; as discussed with regard to FIG. 3. Parking brake actuation lines 50 and 52 are connected from line 46 to the upstream end of the slack adjustment section of boosters 32 and 34 as shown in full detail Ser. No. 484,197. Parking brake deactuation line 54 runs along the length of sections 14, 16 and 18 and is flexibly joined between sections 14 and 16, and 16 and 18 by connector blocks 42. Line 54 is hydraulically connected to the brake unlocking portion of mechanism 48 by lines 54A, 54B and 54C. A hydraulic fluid reservoir or sump line 56 runs along the length of sections 14, 16 and 18 and is flexibly joined between sections 14 and 16, and 16 and 18 by connectors 58 and 60 which are identical to connectors 30. Lines 55 and 57 connect boosters 32 and 34 to sump line 56, as indicated.

A conventional pressure reduction relay valve 62 is connected to air pressure line 10. This valve has the function of accelerating the pressure reduction along the pressure line 10, which signals the need for a brake application. It is of the type commonly required in rail cars having over 75 feet of air pressure line in each car. A hydraulic parking brake actuator 64 is connected to lines 46 and 54 and to hydraulic fluid reservoir or sump 66 which, in turn, is connected to line 56, as indicated. Handwheel 68, located conveniently on the exterior of the car, is turned to operate actuator 64 as discussed with regard to FIG. 2.

Figure 4:
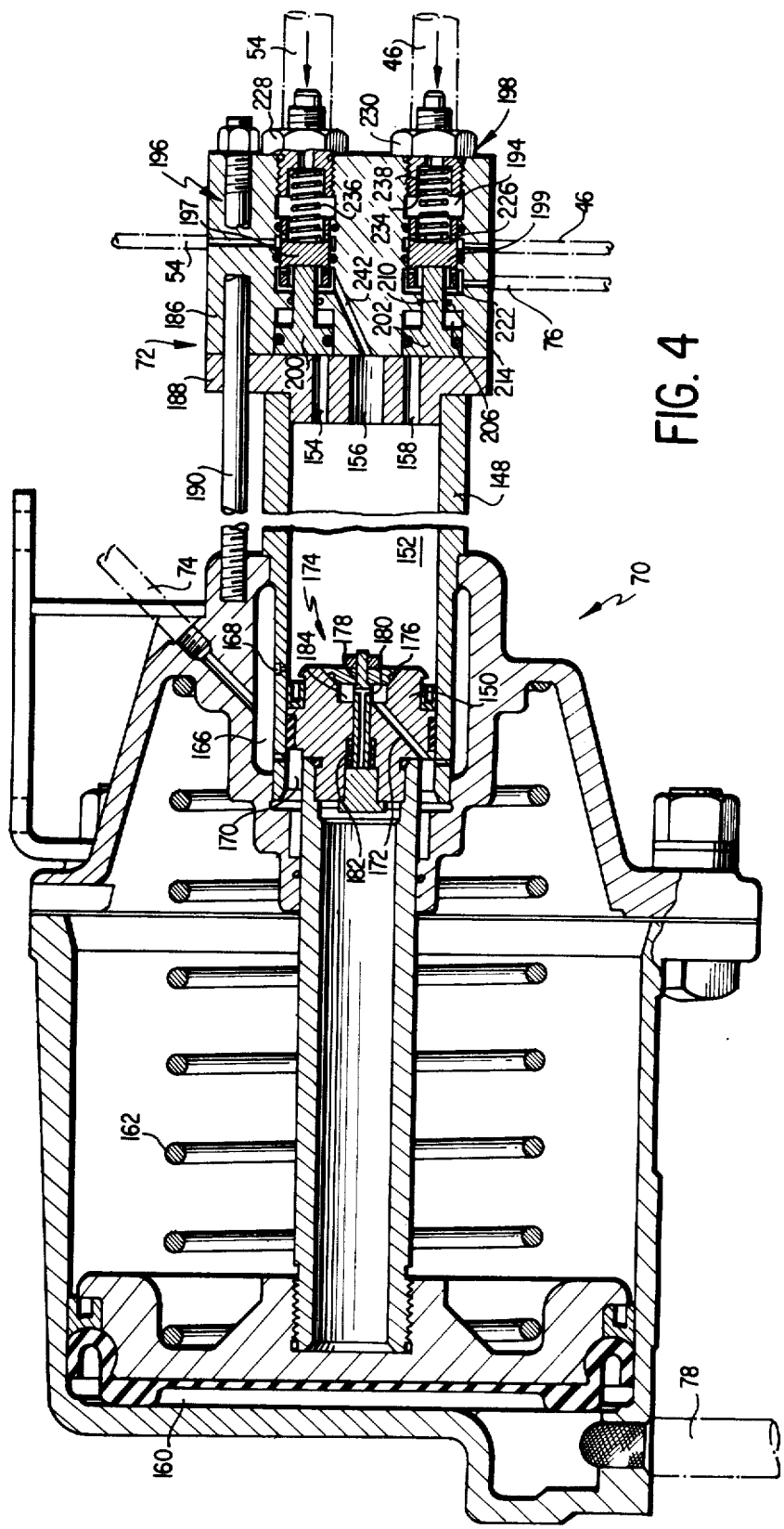
FIG. 4 shows a section view of the pneumatic-to-hydraulic convertor with dual three way valves according to the invention.

Connected in series with lines 46 and 54 is brake release ensuring booster 70, which includes dual three-way valve section 72, as discussed more fully with regard to FIG. 4. Sump branch lines 74 and 76' join booster 70 and valve section 72 to main sump line 56 and pneumatic branch line 78 joins booster 70 to air pressure line 10.

Figure 2:
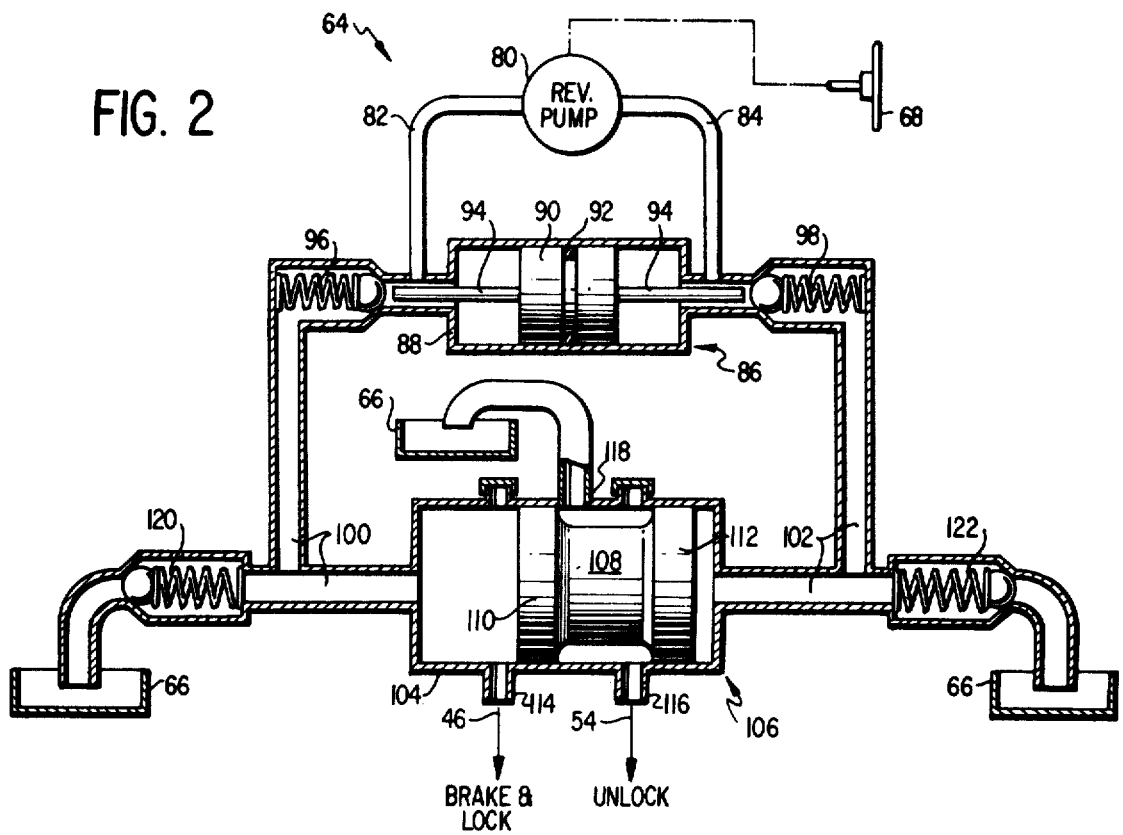
FIG. 2 shows a schematic representation of a parking brake system suitable for use with the invention.

Turning now to FIG. 2, the structural details and operation of hydraulic hand brake actuator 64 may be understood. The hand brake actuator comprises a reversible hand pump 80 which is actuated by hand wheel 68 located on the exterior of one of the car sections, as indicated in FIG. 1. Branch lines 82 and 84 connect reversible hand pump 80 to a double-piloted check valve 86. Check valve 86 comprises a cylinder 88 in which a piston 90 is slidably received and sealed thereto by O-ring 92. Attached to the opposite faces of piston 90 are pilot rods 94 which extend axially from piston 90 a distance just short of check valves 96 and 98, when piston 90 is in the mid-position. Valves 96 and 98 are attached to the cylinder 88 just out-board of the point where branch lines 82 and 84 communicate with the opposite ends of piston 90. Branch lines 100 and 102 extend from check valves 96 and 98 as indicated. The structure comprising elements 80 through 102 may be a commercially procured product such as the hand pump manufactured by Hynautic, Inc., having part No. B-950044. It can be seen that branch lines 100 and 102 comprise combined inlet and outlet ports for pump 80 which may be selectively operated so as to pump fluid into branch line 100 and out of branch line 102 when pump 80 is operated in one direction and out of branch line 100 and into branch line 102 when pump 80 is operated in the opposite direction.

Branch lines 100 and 102 are connected to the opposite ends of valve cylinder 104 of selector valve 106. A valve spool 108 is slidably received in valve cylinder 104 and includes lands 110 and 112 at either end thereof for sliding contact with cylinder 104. Port 114 provides communication between the left end of cylinder 104 and line 46 when spool 108 is in its right hand position. Port 116 provides communication between the right end of cylinder 104 and line 54, when spool 108 is in its left hand position. Port 118 provides communication from port 114 to reservoir 66 when spool 108 is in its left hand position and from port 116 to reservoir 66 when spool 108 is in its right hand position. Check valves 120 and 122 connect branch lines 100 and 102 to reservoir 66 as indicated.

In operation to actuate the parking brake, the crewmen will manipulate hand wheel 68 to cause pump 80 to discharge oil under pressure to line 82. As pressure develops in this line, piston 90 of unit 86 will shift to the right and rod 94 will open valve 98, permitting pump 80 to draw oil from reservoir 66 through check valve 122. Simultaneously, check valve 96 is lifted from its seat, permitting high pressure oil to flow into branch line 100. This causes check valve 120 to remain closed and moves spool 108 to the right, permitting oil to flow through port 114 to line 46 and to deliver fluid to the brake locking portion of units 48. Port 116 is also connected to reservoir 66 via port 118 to permit return flow of fluid from the brake unlocking portion of units 48. A portion of the fluid pumped through line 46 by pump 80 is delivered to boosters 32 and 34 via lines 50 and 52 and thence to brake actuators 44, exactly as in the case of a service brake application. Consequently, after the brake actuators 44 have set the brakes, the brake locking portion of units 48 will be effective to hold them in that condition.

In order to release the parking brake application, the crewman will manipulate hand wheel 68 in the opposite direction and again actuate pump 80. Under this condition, the output of pump 80 is delivered through line 84, valve 98, port 116 and line 54 to the brake unlocking portions of units 48 of brake actuators 44. As soon as enough pressure is developed to shift spool 108 to the left, line 46 is vented through port 114 and port 118 to reservoir 66. When the pressure in line 54 reaches the required level due to continued actuation of pump 80, the unlocking portions of units 48 will release the brake actuators 44 and allow their cylinders to retract under the action of the external forces acting on them. As the brake actuators 44 retract, they displace oil back through boosters 32 and 34 to reservoir 66 via lines 50 and 52, line 46 and spool 108.

If the parking brake is applied while a service brake application is in effect, lines 50 and 52 will be connected via boosters 32 and 34 with the brake actuators 44, but little if any oil will be delivered to the cylinders because the brakes are already applied. However, the pressure developed in control line 46 will cause the brake locking portions of units 46 to actuate the cylinder locks. In the event the parking brake application is then released, the brake unlocking portions of units 46 of brake actuators 44 will release the cylinder locks but brake cylinder pressure will not be released because boosters 32 and 34 will continue to apply braking pressure until released. Ser. No. 484,197 provides full details of the operation of boosters 32 and 34.

In a similar manner, if the service brake is applied while a parking brake application is in effect, the hydraulic pressure generated by boosters 32 and 34 will be delivered to brake actuators 44, but little if any oil will actually be delivered to the cylinders. When the service brake application is released, in no event will the release effect the condition of the brake locking portion of units 46.

Figure 3:
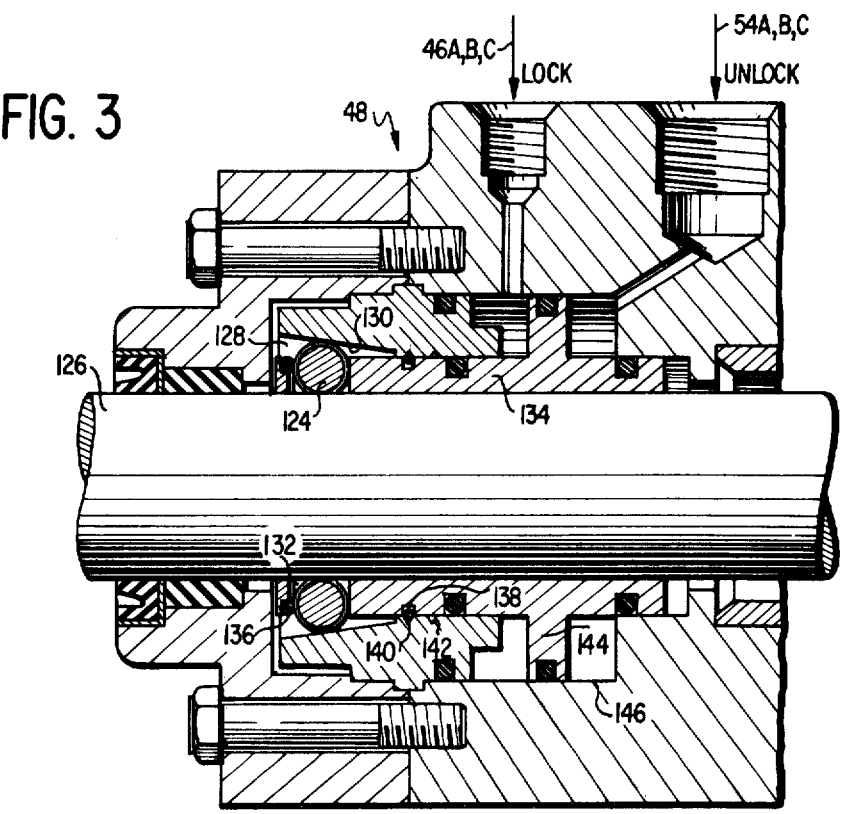
FIG. 3 shows a sectional view of a parking brake locking and unlocking mechanism of the type operated in accordance with the invention.

FIG. 3 shows an elevation view, primarily in section, of the brake locking and unlocking portions of units 48. Additional details are shown in U.S. Pat. No. 3,586,138, which also discloses other brake locking and unlocking portions suitable for use in the system shown in FIGS. 1 and 2. A plurality of uniformly spaced rollers 124 surround piston rod 126 which extends from actuators 44, not shown in this view, to the brake mechanism, also not shown. Rollers 124 are located in a tapered space 128 formed between rod 126 and an encircling conical cam surface 130. The number of rollers 124 may be chosen as required by loading stresses exerted on the rollers and by the rollers on rod 126; however, eight have proven adequate. The rollers 124 are held captive in slots 132 in actuator member 134 so that their axes are transverse to the longitudinal axis of piston rod 126 and are biased toward the small diameter end of space 128 by an elastic O-ring 136 or similar resilient device, confined between the rollers 124 and the end of slots 132. The rollers are shaped to ensure line or surface contact between the rollers and mating parts, cam surface 130 and piston rod 126.

Actuator member 134 includes a detent 138 in the form of a snap ring carried in a groove formed in the periphery of actuator member 134 and adapted to expand into one or the other of a pair of grooves 140 and 142 located in the surrounding stationary structure. Groove 140 is located so that rollers 124 are positioned in the unlocked portion of tapered space 128, where they fit loosely between piston rod 126 and cam surface 130. Groove 142 is located so that rollers 124 are positioned in the locked portion of tapered space 128, where they are wedged tightly between piston rod 126 and cam surface 130. At the end of actuating member 134 opposite the location of slots 132 is located an integral, double-acting piston 144 which moves within cylinder 146. Brake unlocking lines 54A, B and C communicate with the right side of piston 144; and locking lines 46A, B and C, with the left side, as shown.

When a brake actuator having a unit 48 as shown in FIG. 3 is in use and a handbrake application is made, pump 80 will deliver fluid under pressure via lines 46A, B anc C, causing piston 144 to overpower detent 138 and shift actuator element 134 to the right, where detent 138 engages groove 142 and locks element 134 in position. Rollers 124 are simultaneously moved toward the narrow end of tapered space 128 and wedged tightly between piston rod 126 and cam surface 130. In this position, rod 126 is permitted movement in the leftward, brake actuating direction, due to the movement of rollers 124 permitted by O-ring 136; however, movement in the rightward, brake deactuating direction is prevented.

The feature of brake locking mechanisms such as that of FIG. 3 whereby the locking mechanism is mechanically restrained by means such as detent 138 and groove 142 does ensure that the parking brake, once set, will not be released by mere loss of pressure in line 46. However, it is been observed in practice that crewmen frequently do not turn hand wheel 68 far enough to ensure that adequate pressure is developed in line 54 to move piston 144 back to the left, overpowering the engagement of detent 138 with groove 142 and re-engaging detent 138 with groove 140 in the unlocked position. Even a partial turn of handwheel 68 may generate enough pressure to cause spool 108 to shift to the left in FIG. 2 and depressurize the left side of piston 144; however, this pressure frequently is not enough to unlock actuating element 134, even though the crewman may "feel" enough change to conclude that unlocking has occurred. Thus, the brake actuators 44 are not free to retract under the influence of external forces acting on them.

Since rail yard crewmen may mistake the change in resistance to movement of handwheel 68 caused by the movement of spool 108 as an indication that the brakes have been unlocked, the apparatus of the invention provides means for ensuring total release of the brakes as soon as the conventional pneumatic brake line has been pressurized. FIG. 4 shows the details of brake release ensuring booster 70 and valve section 72. Booster 70 comprises a hydraulic pump including a cylinder 148 and a reciprocable piston 150 which cooperate to define a working space 152 provided with passages 154, 156 and 158 through which fluid is transferred to and from valve section 72. Piston 150 is moved on its discharge stroke to displace oil from space 152 by an air motor 160 which responds to the pressure existing in brake line 10 and is moved on its return stroke to the illustrated retracted position by a return spring 162. The maximum output pressure of the hydraulic pump equals and product of the pneumatic pressure supplied to motor 160 and the ratio of the effective area of the motor piston to the effective area of pump piston 150. In practice, the maximum pressure in space 152 is about 90 psi. Booster 70 is connected with the reservoir 66 of parking brake control unit 64 via conduit 74 and is provided with two parallel paths through which this conduit communicates with working space 152. The first path comprises passage 166, and a valve which is defined by pump piston 150 and by a port 168 formed in the wall of cylinder 148, which is open only when the piston is in, or very near, its retracted position, as shown. This path serves to maintain space 152, and the volumes connected with it, liquid-filled when the pressure in brake line 10 drops enough to permit spring 162 to return motor 160 to its retracted position. The second flow path comprises passage 166, the rod end space 170 of cylinder 148, and a passage 172 extending through piston 150 and containing a check valve 174 oriented to block flow from the working space 152.

This second path is effective to control the suction which booster 70 imposes on valve section 72 and to insure return of piston 150 to its retracted position. Check valve 174 includes a seat 176 formed on piston 150, and a cooperating poppet head 178 which is fixed to a reciprocable stem 180 and is biased against the seat by a light coil compression spring 182. Oil is delivered to the check valve through the inclined passage 172 which interconnects the rod end cylinder space 170 with a chamber 184 formed in piston 150 adjacent the upstream end of seat 176. The head 178 has a valving surface comprising both a metal portion and a portion defined by an elastic O-ring. With this type of design, the pressure drop across the valve head must be kept relatively low in order to prevent lifting of the O-ring from its groove in the head; therefore, the angled passage 172 is so sized that it develops the major portion of the pressure differential required to open valve 174. This aspect of the design has a desirable side effect in that it affords to the designer a convenient way to control the degree of suction which the booster 70 applies to valve portion 72 by reducing or increasing the diameter of passage 172.

Figure 4A:
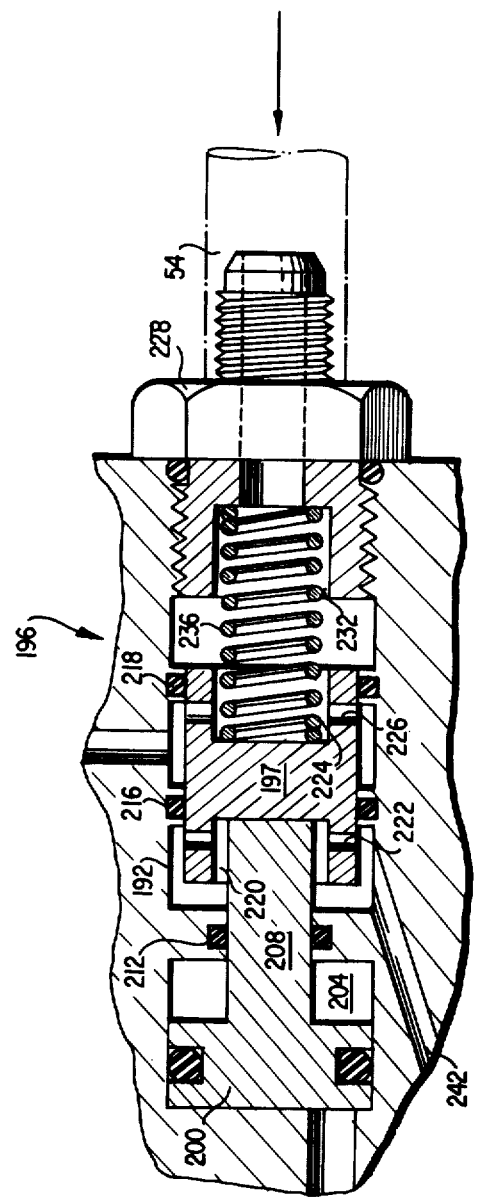
FIG. 4A shows an enlarged view of one of the three way valves shown in FIG. 4.

As shown in FIGS. 4 and 4A, dual three-way valve unit 72 comprises valve body 186 and end plate 188 which are bolted to the right end of cylinder 148 via bolts 190. Ports 154, 156 and 158 extend axially through end plate 188 to provide hydraulic communication between working space 152 and valve unit 72. Valve body 186 includes two stepped bores 192 and 194 which slidably receive the operating elements of three-way unlocking valve 196 and three-way locking valve 198. The structure and function of valves 196 and 198 are identical for each valve, though the porting arrangements differ as will be discussed.

Slidably located in the ends of bores 192 and 194 adjacent end plate 188 are pilot pistons 200 and 202 which include sealing O-rings as indicated. Piston 200 communicates with port 154 on its left side and with vented end space 204 on its right. Similarly, piston 202 communicates with port 158 on its left side and vented end space 206 on its right. Actuator rods 208 and 210 extend from pistons 200 and 202 and are slidably, sealingly received in bores formed in partitions 212 and 214, which divide bores 192 and 194 into pilot piston and valve spool sections.

The valve spool sections of bores 192 and 194 each include spaced lands 216 and 218, which slidably receive valve spools 197 and 199. O-rings in each land 216 and 218 provide sealing. The left end of each spool 197 and 199 includes a counter bore 220, into which one of actuator rods 208 and 210 extend. Radial passages 222 through the side walls of counter bore 220 provide flow paths for hydraulic fluid as will be discussed. Similar counter bores 224 and radial passages 226 are provided in the right end of spool 197 and 199. The right ends of bores 192 and 194 are threaded to sealingly receive hydraulic fittings 228 and 230, connected to lines 54 and 46 from pump 80. Fittings 228 and 230 include counter bores 232 and 234 which, in cooperation with counterbore 224 in valve spools 196 and 198, retain biasing springs 236 and 238 which hold spools 196 and 198 in their illustrated left hand position.

In valve 196, the space between lands 216 and 218 is connected to unlock actuator line 54. The space to the left of land 216 is connected to passage 242, which communicates with port 156. In the illustrated position, flow is permitted in line 54, through radial passages 226 and out through the continuation of line 54.

In valve 198, the space between lands 216 and 218 is connected to lock actuator line 46. The space to the left of land 216 is connected to sump 66 via line 76. In the illustrated position, flow is permitted in line 46, through radial passages 226 and out through the continuation of line 46. Thus, when booster 70 is in its illustrated position, the parking brake system continues to function just as described with regard to FIG. 2.

To understand the operation of booster 70 and valve unit 72, assume that brake line 10 is depressurized and the parking brake lock has been actuated. Assume further that, preparatory to intended movement of the car, a crewman has rotated handwheel 68 for enough to shift spool 108 to the left in FIG. 2 but not far enough to unlock the brakes. Just shifting the spool 108 will depressurize line 46 to sump 66. When the brake line 10 is pressurized prior to movement of the train, air is admitted to pneumatic motor 160, causing piston 150 to move to the right. This increases the pressure in working space 152 and causes pilot pistons 200 and 202 to move to the right, thus forcing spools 197 and 199 to the right against the action of springs 236 and 238. Pressure acting continuously in radial passages 222 and 226 forces the O-rings in lands 216 and 218 to remain in their grooves, thus minimizing friction and O-ring wear. Hydraulic fluid now flows from space 152, through passage 242, through radial passage 222 of spool 196 and out through the continuation of line 54 to unlock the brakes. Simultaneously, return flow from the locking side of piston 144 in FIG. 3 is permitted via line 46, radial passages 222 in spool 198 and line 76.

Due to present railway regulations which require a crewman to move or confirm all parking brakes to an "OFF" position, the position of spool 108 generally will be as assumed. Thus, the release ensuring system will leave the parking brake system in position for its next application. If, however, the crewman has failed to even partially release the parking brake of a particular car, the booster 70 will be ineffective to release either the brake or the brake locking mechanism. This is because until spool 108 is shifted to the left in FIG. 2, the full brake actuating and locking pressure developed by pump 80 will exist in line 46, assuming no leakage. Pneumatic motor 160 and piston 150 are sized so that the maximum pressure developed in working space 152 will be substantially less than the pressure developed by pump 80 to actuate and lock the brakes. Since pilot pistons 200 and 202 are of the same effective area as spools 196 and 198, the pressure force acting on the right side of spool 198 will exceed that acting on pilot piston 202. Line 54 is connected to sump 66 in this situation, thus pilot piston 200 may move spool 196 to the right; however, no brake unlocking is achieved since the brake locking force acting on the right side of piston 144 in FIG. 3 exceeds that acting on the left side. Furthermore, check valve 120 in FIG. 2 prevents reversal of flow in line 46.

The same features which prevent parking brake release until spool 108 has been shifted will permit the parking brake system to be actuated even where pneumatic motor 160 is pressurized. Handwheel 68 is turned sufficiently far to develop enough pressure to return spools 196 and 198 to their left hand positions and permit parking brake application and locking. To obtain a release, the hand wheel must be rotated in the opposite direction at least far enough to cause spool 108 to shift to the left in FIG. 2.

Having described our invention in sufficient detail to enable one in the art make and use it, we claim:

1. A brake apparatus for a vehicle, comprising:
 a first normally pressurized fluid line for transmitting fluid pressure corresponding to a desired brake application force;
 means responsive to reductions in the pressure in said first line for effecting service and emergency application of the brakes of said vehicle;
 means for locking said brakes to retain them in the applied condition and for unlocking said brakes to allow them to return to the released condition;
 independently operably parking brake actuating means for applying said brakes and actuating said locking means and for releasing said brakes and actuating said unlocking means; and means responsive to increases in the pressure in said first line means for automatically actuating said unlocking means as said first fluid line is repressurized following service or emergency brake application.

2. Brake apparatus according to claim 1, wherein said parking brake actuating means includes a second, fluid output line, said means for releasing said brakes and actuating said unlocking means being responsive to the pressure in said second, fluid output line, said means for automatically actuating said unlocking means comprising:

a pneumatic motor responsive to variations in the pressure in said first fluid line;

a hydraulic master cylinder and piston means operatively connected to said pneumatic motor for converting pneumatic pressure to hydraulic pressure; and first valve means connected to the output of said master cylinder and in series with said second, fluid output line for selectively permitting flow of hydraulic fluid between said master cylinder and a first port in said first valve means, said first port being operatively connected to said means for releasing said brakes and actuating said unlocking means, in response to an increase in hydraulic pressure in said master cylinder; or for permitting flow of hydraulic fluid between said first port and a second port in said first valve means, said second port being operatively connected to said second, fluid output line, in response to a decrease in the hydraulic pressure in said master cylinder.

3. Brake apparatus according to claim 2, wherein said parking brake means includes a third, fluid output line, said means for applying said brakes and actuating said locking means being responsive to pressure in said third, fluid output line, said means for automatically actuating said unlocking means further comprising:

second valve means connected to the output of said master cylinder and in series with said third, fluid line for selectively permitting flow of hydraulic fluid between a third vent port in said second valve means and a fourth port in said second valve means, said fourth port being operatively connected to said means for applying said brakes and actuating said locking means, in response to said increase in the hydraulic pressure in said master cylinder; or for permitting flow of hydraulic fluid between said fourth port and a fifth port in said second valve means, said fifth port being operatively connected to said third, fluid output line, in response to said decrease in the hydraulic pressure in said master cylinder.

4. Brake apparatus according to claim 3, wherein said parking brake actuating means further comprises:

a reversible hand pump having a pair of combined inlet and branch lines to accommodate flow in both directions; and a selector valve means responsive to the differential pressure between said branch lines for selectively connecting said second, fluid output line to one of said branch lines and said third, fluid output line to vent in a first position of said selector valve; and for selectively connecting said second, fluid output line to vent and said third, fluid output line to the other of said branch lines in a second position of said selector valve.

5. Brake apparatus according to claim 2, wherein said first valve means is a spring-biased, two position valve comprising a first pilot piston movable in response to the pressure in said master cylinder to selectively acruate said first valve means.

6. Brake apparatus according to claim 5, wherein said second valve means in a spring-biased, two position valve comprising a second pilot piston movable in response to the pressure in said master cylinder to selectively actuate said second valve means.

7. Brake apparatus according to claim 2, wherein said parking brake actuating means further comprises:

a reversible hand pump having a pair of combined inlet and outlet branch lines to accommodate flow in both directions; and a selector valve means responsive to the differential pressure between said branch lines for selectively connecting said second, fluid output line to one of said branch lines in a first position of said selector valve or to vent in a second position of said selector valve.

* * * * *